United States Patent [19]  
Toy

[11] Patent Number: 4,458,356  
[45] Date of Patent: Jul. 3, 1984

[54] CARRIER RECOVERY CIRCUIT  
[75] Inventor: William W. Toy, Eatontown, N.J.  
[73] Assignee: Bell Telephone Laboratories, Incorporated, Murray Hill, N.J.  
[21] Appl. No.: 394,848  
[22] Filed: Jul. 2, 1982  
[51] Int. Cl.³ ............................................ H04L 27/00  
[52] U.S. Cl. ...................................... 375/120; 375/81; 375/82  
[58] Field of Search ...................... 375/39, 54, 85, 119, 375/120, 97, 81, 82; 329/122; 307/512, 262, 269; 328/155

[56]  References Cited  
U.S. PATENT DOCUMENTS

| | | | |
|---|---|---|---|
| 3,818,347 | 6/1974 | Holsinger | 375/39 X |
| 3,934,205 | 1/1976 | Bogert | 375/119 X |
| 3,978,407 | 8/1976 | Forney, Jr. et al. | 375/39 X |
| 4,027,265 | 5/1977 | Kobayashi et al. | 375/85 X |
| 4,079,329 | 3/1978 | England et al. | 375/120 X |
| 4,234,957 | 11/1980 | Tracey et al. | 375/120 X |

OTHER PUBLICATIONS

*Synchronization Systems in Communication and Control,* 1972, pp. 65–129.  
Yamashita et al., "Synchronous Phase Demodulators for High Speed Quadrature PSK Transmission Systems," Fujitsu *Scientific & Technical Journal,* Dec. 1975, pp. 57–80.  
Shimamura, "On False-Lock Phenomena in Carrier Tracking Loops," IEEE Transactions on Communications, vol. Com-28, No. 8, Aug., 1980, pp. 1326–1334.  
Yoshida et al., "6G-90 Mbps Digital Radio System with 16 QAM Modulation," International Conference on Communications, 1980, pp. 52.4.1–52.4.2.  
Horikawa et al., "16 QAM Carrier Recovery with Selective Gated Phase Locked Loop," The Transactions of the IECE of Japan, vol. E63, No. 7, Abstracts, Jul., 1980, pp. 548–549.  
Hogge, Jr., "Carrier and Clock Recovery for 8 PSK Synchronous Demodulation," IEEE Transactions on Communications, vol. COM-26, No. 5, May, 1978, pp. 528–533.  
Hespe H. et al., "Digital Carrier and Timing-Recovery for Quadrature Amplitude Modulation (QAM) Data Transmission Systems," Archiv Elektron Übertr 34(3): 133–141, Mar. 1980, Bell Labs Trans.

*Primary Examiner*—Robert L. Griffin  
*Assistant Examiner*—Albert W. Watkins  
*Attorney, Agent, or Firm*—David R. Padnes

[57]  ABSTRACT

A carrier recovery circuit is disclosed for use in the receiver of a digital transmission wherein channels of data are formed by demodulating incoming quadrature-related carriers using receiver-generated, quadrature-related carriers. Phase alignment of the receiver-generated carriers to the incoming carriers is provided by integrated data from a preselected channel when the channels of data correspond to preselected regions in the signal space diagram.

10 Claims, 4 Drawing Figures 4,458,356

CARRIER RECOVERY CIRCUIT

TECHNICAL FIELD

The present invention relates to digital systems which transmit modulated quadrature-related carriers and more particularly to a carrier recovery circuit for use in the receiver of such systems.

BACKGROUND OF THE INVENTION

A number of digital systems transmit a signal comprising linearly added quadrature-related carriers which have been modulated with digital data channels. Each of the quadrature-related carriers has the same frequency. A variety of different modulation schemes, such as phase shift keying (PSK) and quadrature amplitude modulation (QAM), are often used. Such modulation schemes can be represented by a two-dimensional signal space diagram having four quadrants. Within this diagram, a data point, comprising a portion of data from each data channel, is plotted for each of the transmitted data combinations.

In the receiver, the incoming signal is demodulated using local carriers and the digital data channels are regenerated. These local carriers must be synchronous with the incoming carriers for coherent demodulation. Since the incoming carriers are often suppressed, the information necessary to control the phase of the local carriers must be derived from the received signal. The circuitry which derives the phase aligning or phase error signal is called a carrier recovery circuit.

Carrier recovery circuits can be categorized depending on how the phase error signal is derived. One category includes those circuits which derive a reference signal at the carrier frequency, or some harmonic thereof, by nonlinear processing of the received signal before demodulation. These circuits usually do not meet the low phase jitter objectives required in many system applications. A second category of carrier recovery circuits, known as baseband carrier recovery circuits, drives a phase error signal by processing the received signal after demodulation. While the second category of circuits reduces the phase jitter, the processing is generally limited to a particular type of demodulation. It would, therefore, be desirable to develop a carrier recovery circuit which provides low jitter and is adaptable for use in a number of different modulation schemes.

SUMMARY OF THE INVENTION

The carrier recovery circuit, in accordance with the present invention, examines the demodulated data channels formed by demodulating incoming quadrature-related carriers. First data which falls within a first region in a signal space diagram along with second data which falls in a second predetermined region in a signal space diagram are identified. Preferably, the first and second data are identified at selected times to reduce intersymbol interference. The portions of the first identified and second identified data within a preselected data channel are separately integrated. The integrated data portions are used to phase align quadrature-related carriers generated in the receiver with the incoming quadrature-related carriers. The above described generation of the phase error signal is applicable to systems utilizing either PSK or QAM modulation.

DETAILED DESCRIPTION

Figure 1:
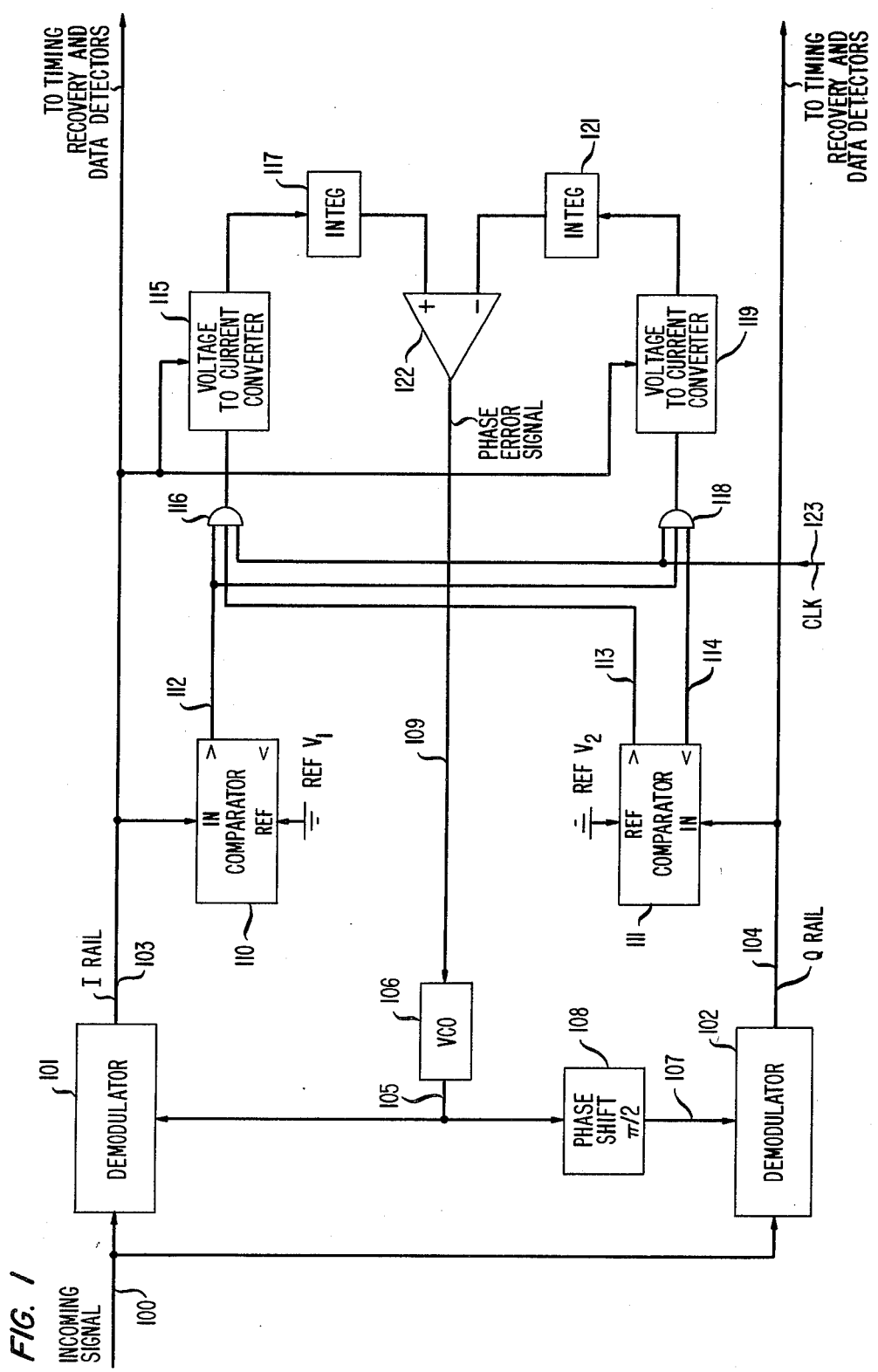
FIG. 1 is a block schematic diagram of a carrier recovery circuit in accordance with a first embodiment of the present invention.

FIG. 1 shows a carrier recovery circuit within the receiver of an illustrative 16 QAM digital radio system. At the transmitter (not shown), two quadrature-related carriers are modulated by two digital data channels. Both carriers are at some preselected intermediate frequency (IF). After modulation, the quadrature-related carriers are translated or "up-converted" to radio frequency carriers. After propagation through a suitable transmission medium, the transmitted radio signals enter a receiver where they are translated or "down-converted" back to IF.

The incoming signal on lead 100, comprising the modulated IF quadrature-related carriers, is coupled to demodulators 101 and 102 which respectively form digital data channels 103 and 104. Channel 103, commonly called the I or in-phase rail, and channel 104, commonly called the Q or quadrature rail, each comprise amplitude-modulated digital pulses. The I and Q rails are supplied to well-known timing recovery and data detection circuitry within the receiver which regenerates the digital bit streams supplied to the transmitter.

Demodulator 101 generates channel 103 by multiplying the signal on lead 100 by a first local carrier on lead 105. The first local carrier is produced by voltage-control oscillator (VCO) 106. Similarly, demodulator 102 generates digital data channel 104 by multiplying the signal on lead 100 by a second local carrier on lead 107. This second local carrier is formed by phase shifting the first local carrier by $\pi/2$ radians via phase shifter 108. Hence, the first and second local carriers are quadrature-related carriers.

To provide coherent demodulation, the first and second local carriers are phase aligned to the quadrature-related carriers on lead 100 by means of a phase error signal generated on lead 109. This phase error signal is generated by selectively integrating first and second data from channel 103. The first data is integrated when the data in channels 103 and 104 fall within a first region of the 16 QAM signal space diagram while the second data is integrated when the data in channels 103 and 104 fall within a second region of the 16 QAM signal space diagram.

Figure 2:
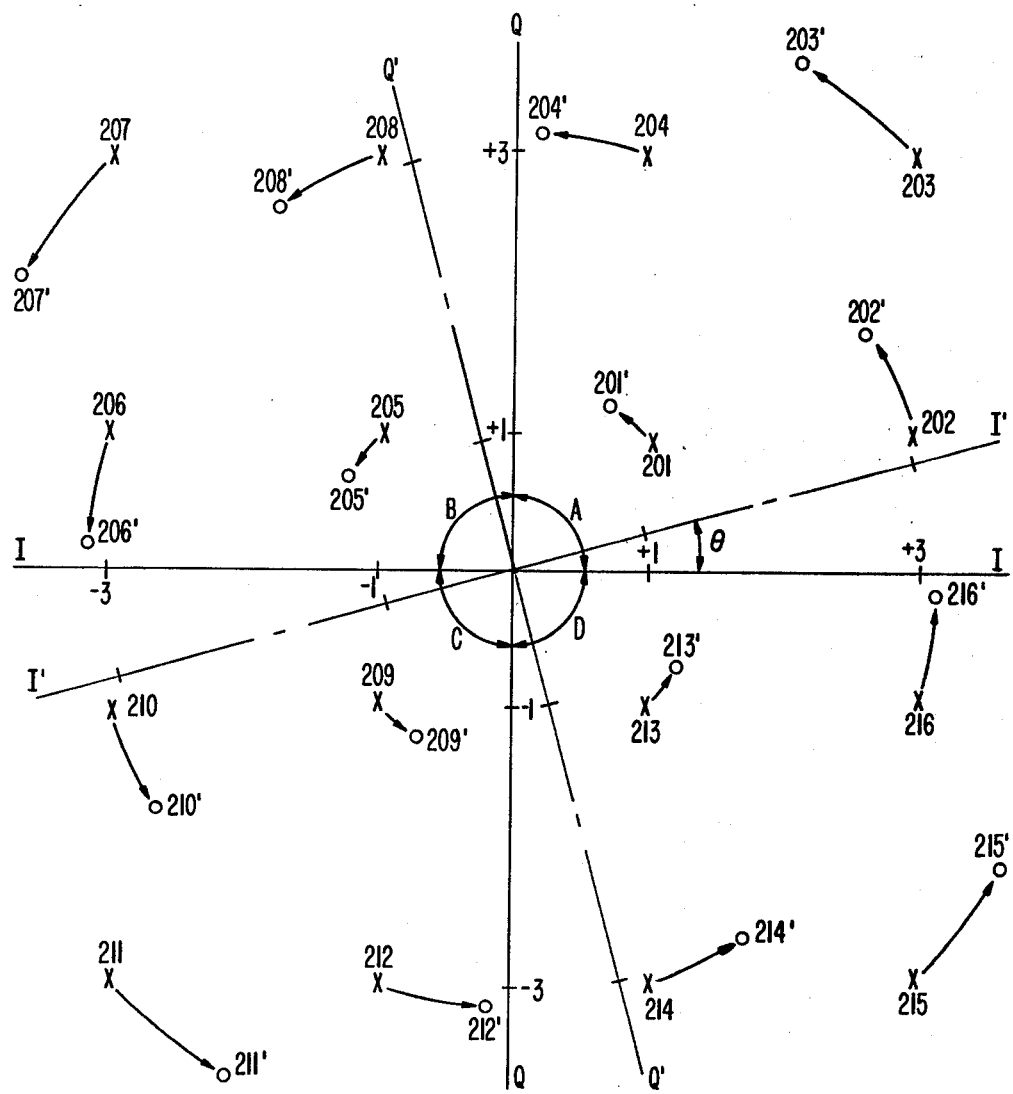
FIG. 2 is a signal space diagram for an illustrative 16 QAM signal.

Refer now to FIG. 2 which illustrates a 16 QAM signal space diagram comprising four quadrants, A, B, C and D, defined by the I and Q axes. Within this diagram, data points 201 through 216 are plotted to ideally represent all of the possible transmitted data combinations. Each data point has an I and Q component with each component corresponding to the data transmitted from one of the two transmitter channels. The permissible values of the I and Q components are $-3, -1, +1$ and $+3$ volts. In an ideal system, the I and Q components of each transmitted data point appear as data in channels 103 and 104, respectively.

It should be noted that, assuming a uniform probability of any data point occurrence, the averaged I or Q component of the data points in one quadrant is equal in magnitude to the averaged I or Q component in an adjacent or diagonally opposing quadrant. Adjacent quadrants are defined as quadrants having a common boundary line comprising a portion of either the I or Q axis. The possible adjacent quadrants are, therefore, quadrants A and B, or B and C, or C and D, or A and D. The diagonally opposing quadrants are those quadrants which only share a common boundary point at the origin. The diagonally opposing quadrants are, therefore, quadrants A and C or B and D.

Consider now the effect of phase error, i.e., the lack of phase alignment between the local quadrature-related carriers and the quadrature-related carriers comprising the signal on lead 100. Phase error can be represented by a rotation of the signal space diagram. In FIG. 2, for a small counterclockwise rotation of angle $\theta$, the I and Q axes appear as I' and Q' and each of the data points 201 through 216 appear as a corresponding one of the data points 201' through 216'. Now, the averaged I or Q component of data points in one quadrant is not equal in magnitude to the averaged corresponding component of data points in an adjacent quadrant. For example, in FIG. 2', the averaged I component of data points 201' through 204' within quadrant A is less than the averaged I component of the data points 213' through 216' within quadrant D. Of course, for a clockwise rotation of the signal space diagram by the same angle $\theta$, the averaged I component of data points 201' through 204' within quadrant A will be greater than the averaged I component of the data points 213' through 216' within quadrant D. Accordingly, the difference between the averaged absolute value of the I or Q component of data in one quadrant and the averaged absolute value of the corresponding component of data in a second adjacent quadrant varies with the phase error. Due to the symmetry of the modulation format, it should be noted that the difference between the averaged absolute value of the I or Q component of data within a first pair of diagonally opposing quadrants and the averaged absolute value of the corresponding component of data within a second pair of diagonally opposing quadrants also varies with the phase error. These results will be utilized in the embodiments of the present invention.

Referring back to FIG. 1, the phase error signal on lead 109 is generated from the difference between the averaged I component of first data in quadrant A and the averaged I component of second data within quadrant D. Comparators 110 and 111 respectively compare the data in channels 103 and 104 against reference voltages, REF $V_1$ and REF $V_2$, of zero volts. Lead 112 is logical "1" when the data in channel 103 is greater than zero volts and lead 113 is logical "1" when the data in channel 104 is greater than zero volts. Similarly, lead 114 is logical "1" when the data in channel 104 is less than zero volts. Consequently, the presence of first data within quadrant A corresponds to logical "1" levels on leads 112 and 113 while the presence of second data corresponds to logical "1" levels on leads 112 and 114. Voltage to current converter 115 and integrator 117 average the I component of the first data and voltage to current converter 119 and integrator 121 average the I component of the second data. Difference amplifier 122 forms the phase error signal by subtracting the output of integrator 121 from the output of integrator 117. Converters 115 and 119 have the same transfer characteristic and are enabled during the presence of first and second data by a logical "1" signal at the output of AND gates 116 and 118, respectively. While AND gate 116 need only logically AND the signals on leads 112 and 113 and AND gate 118 need only logically AND the signals on leads 112 and 114, each AND gate is preferably supplied with the clock pulses from the receiver timing recovery circuit on lead 123 to reduce intersymbol interference. Such clock pulses track the maximum amplitude of the data pulses in channels 103 and 104 and have a short time duration relative to the data pulses. This preferred use of timing recovery circuit clock pulses will be incorporated in the embodiments which follow.

While the embodiment of FIG. 1 operates satisfactorily, it should be noted that only 50 percent of the received data, assuming a uniform probability distribution of data points, is used for generating the phase error signal. Increased gain and sensitivity, if desired, can be obtained in a second embodiment shown in FIG. 3. As in FIG. 1, the output of AND gate 116 is logical "1" when the data in channels 103 and 104 lies in quadrant A and the output of AND gate 118 is logical "1" when the data in channel 103 and 104 lies in quadrant D. Now, in addition, AND gate 301 is used to provide a logical "1" output when the data in channels 103 or 104 lies in quadrant C. Gate 301 is supplied with lead 114, lead 123 and lead 306, the latter being logical "1" when the I rail data is less than zero volts. OR gate 304, coupled to the outputs of AND gates 116 and 302, provides a logical "1" enable signal to converter 115 when the data in channels 103 and 104 lies in diagonally opposing quadrants A or C. In similar fashion, AND gate 302 provides a logic "1" output when the data in the I and Q rail data falls in quadrant B. By coupling the outputs of AND gates 118 and 302 to OR gate 303, a logical "1" signal is generated when enables converter 119 whenever the I and Q rails data falls within quadrants B or D. The I rail voltages supplied to converters 115 and 119 are rectified by absolute value circuit 305. The phase error signal formed on lead 109, therefore, is the difference in the averaged absolute value of the I components of data in a first pair of diagonally opposing quadrants, i.e., A or C, and the I components of data in a second pair of diagonally opposing quadrants, i.e., B or C. Hence, the I component of all data points is utilized to form the phase error signal.

Figure 3:
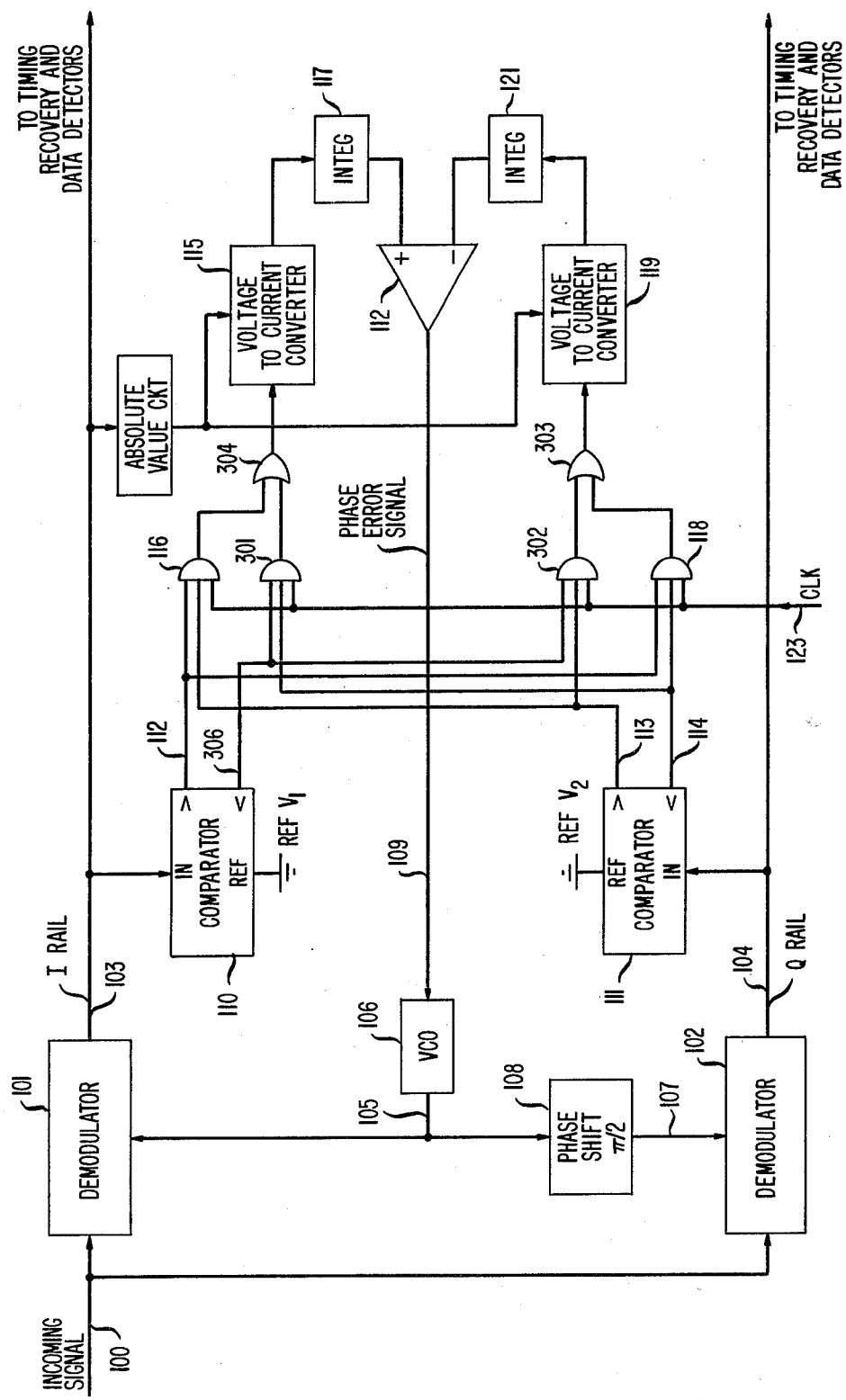
FIG. 3 is a block schematic diagram of a carrier recovery circuit in accordance with a second embodiment of the present invention.
Figure 4:
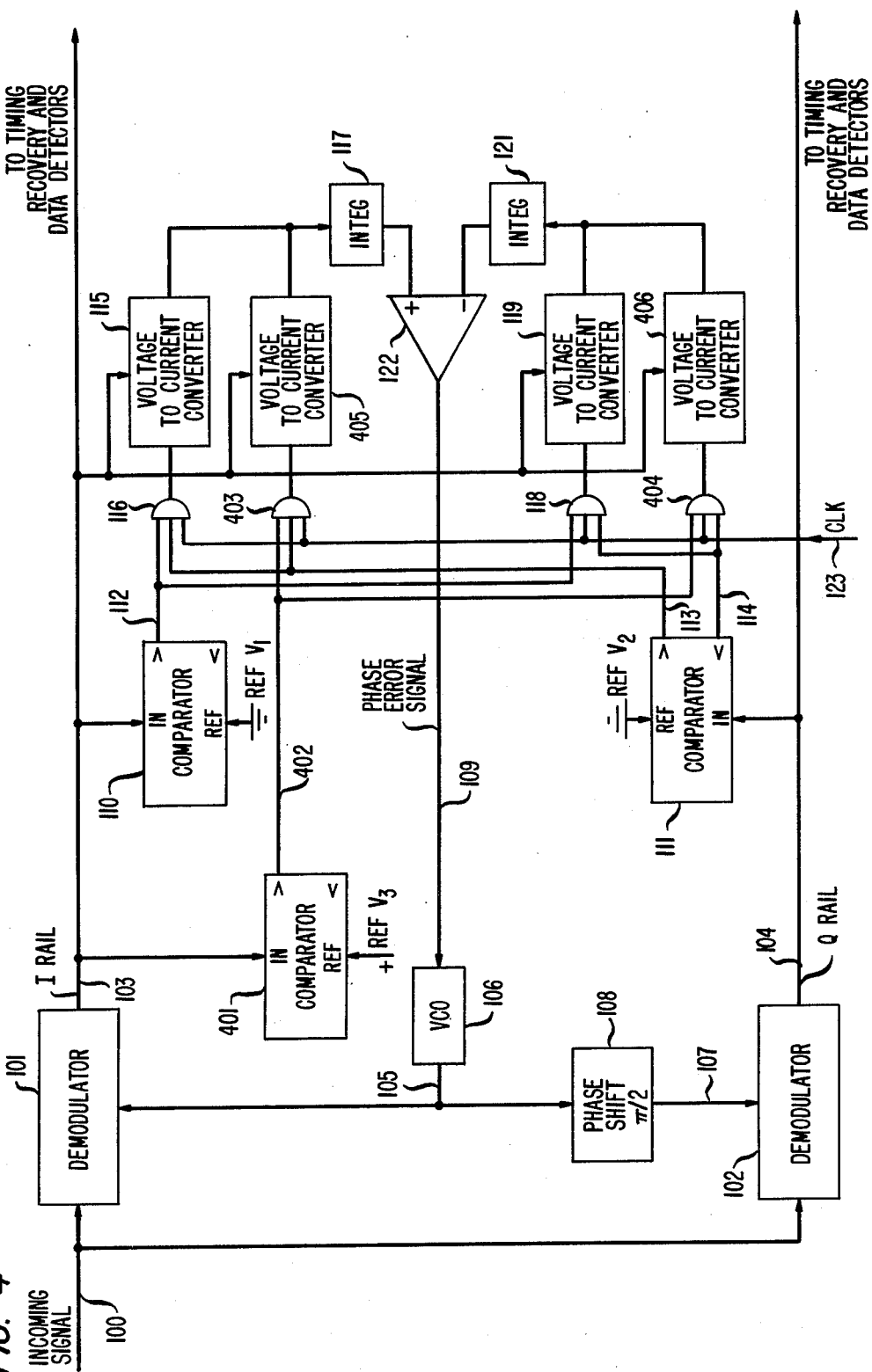
FIG. 4 is a block schematic diagram of a third embodiment of a carrier recovery circuit in accordance with the present invention.

The embodiments shown in FIGS. 1 and 3 are applicable to systems utilizing either QAM or PSK modulation. It has been found, however, that for 16 QAM modulation the adjustment range of the phase error signal is limited due to a false lock condition at 22°. This condition can be alleviated by changing the comparator reference voltages. It has been found, for example, that the false lock condition can be eliminated by changing the reference voltage, REF $V_1$ from zero to 2.95 volts in the embodiments of FIGS. 1 and 3, the latter also requiring the use of an absolute value circuit to rectify the input signals to comparator 110. This solution effectively limits the data used to generate the phase error signal to a portion of the selected quadrants. Alternatively, the phase error signal in either FIGS. 1 or 3 can be generated from a weighted average of the appropriate I component values. FIG. 4 shows the necessary modifications to the embodiment of FIG. 3. Referring to FIG. 4, voltage to current converters 115 and 119 are enabled when the data falls in quadrants A or D, respectively. In addition, comparator 401 compares the data in channel 103 against a reference voltage, REF $V_3$, of 2.95 volts and generates a logical "1" signal on lead 402 when the channel 103 exceeds REF $V_3$. AND gates 403 and 404 then respectively enable voltage to current converters 405 and 406 when the channel 103 and 104 data falls within quadrants A or D and the I component exceeds 2.95 volts. Converters 405 and 406 each provide a current output twice that of converters 115 or 119 for any given voltage input.

The selective activation of converters 405 and 406 causes the I components of data in quadrants A or D which exceed 2.95 volts to be weighted three times as much as the I component of data in quadrants A or D which is less than 2.95 volts. This division of the selected quadrants can be similarly provided in the embodiment of FIG. 1.

While the above-described embodiments generate the phase error signal from selected I data components, it should, of course, be obvious that the selected Q data components can also be used. Finally, while the described input to the carrier recovery circuit comprises modulated IF quadrature-related carriers, the input carriers can be at any preselected frequency.

What is claimed is:

1. A carrier recovery circuit for use in the receiver of a digital transmission system wherein channels of data are formed by demodulating quadrature-related carriers, said circuit comprising means for generating quadrature-related local carriers, first means for integrating the data in a selected channel only when the data in said channels falls within a first predetermined region in a signal space diagram;

second means for integrating the data in said selected data channel only when the data in said channels falls within a second different predetermined region in said signal space diagram; and means responsive to said first and said second integrating means for phase-aligning said local carriers with said carriers.

2. The apparatus of claim 1 wherein said first and second integrating means integrate said selected channel data at a selected time when the data in said channels fall within said first and said second different predetermined regions.

3. The apparatus of claims 1 or 2 wherein said first and said second different predetermined regions are adjacent quadrants in said signal space diagram.

4. The apparatus of claim 1 wherein said first and second different predetermined regions are predetermined portions of adjacent quadrants in said signal space diagram.

5. The apparatus of claims 1 or 2 wherein said first and said second different predetermined regions are different pairs of diagonally opposing quadrants in said signal space diagram.

6. The apparatus of claim 1 wherein said first and said second different predetermined regions are predetermined portions of different pairs of diagonally opposing quadrants in said signal space diagram.

7. The apparatus of claims 1 or 2 wherein said first and said second integrating means each provide a weighted data average.

8. The apparatus of claim 2 wherein said first and second different predetermined regions are predetermined portions of adjacent quadrants in said signal space diagram.

9. The apparatus of claim 2 wherein said first and said second different predetermined regions are predetermined portions of different pairs of diagonally opposing quadrants in said signal space diagram.

10. A carrier recovery circuit for use within the receiver of a digital transmission system wherein channels of data are formed by demodulating quadrature-related carriers using locally-generated quadrature-related carriers, said circuit comprising means for comparing the data in said channels to associated channel thresholds;

first means responsive to a first result of said comparisons for integrating the data in a preselected channel;

second means responsive to a different result of said comparisons for integrating the data in said preselected channel; and means responsive to the data integrated in response to said first and said second result for phase aligning said locally-generated carriers with said carriers.

* * * * *